United States Patent [19]

Voitik

[11] Patent Number: 4,898,394
[45] Date of Patent: Feb. 6, 1990

[54] CREEP SEAL FOR ROTATING SHAFT

[75] Inventor: Robert M. Voitik, Lake Zurich, Ill.

[73] Assignee: Falex Corporation, Aurora, Ill.

[21] Appl. No.: 132,156

[22] Filed: Dec. 14, 1987

[51] Int. Cl.$^4$ ............................................. F16J 15/00
[52] U.S. Cl. ....................................... 277/35; 277/85; 277/138
[58] Field of Search ...................... 277/47, 48, 49, 50, 277/51, 52, 35, 138, 152, 153, 167.3, 44, 45, 92, 85, 86, 87

[56] References Cited

U.S. PATENT DOCUMENTS

| | | | |
|---|---|---|---|
| 2,055,918 | 9/1936 | Victor et al. | 277/50 |
| 2,100,113 | 11/1937 | Travis | 277/47 |
| 2,183,005 | 12/1939 | Boyd | 277/47 |
| 2,291,570 | 7/1942 | Clark | 277/48 |
| 2,334,349 | 11/1943 | Mika | 277/47 |
| 2,447,411 | 8/1948 | Helfrecht | 277/50 |
| 2,483,988 | 10/1949 | Victor | 277/50 |
| 2,485,011 | 10/1949 | Niessen et al. | 277/52 |
| 3,086,782 | 4/1963 | Peickii et al. | 277/92 |
| 3,154,309 | 10/1964 | Voitik | 277/51 |
| 4,750,747 | 6/1988 | Holzev | 277/153 |

FOREIGN PATENT DOCUMENTS

| | | | |
|---|---|---|---|
| 647499 | 8/1962 | Canada | 277/48 |
| 70772 | 4/1942 | Czechoslovakia | 277/47 |
| 699737 | 12/1940 | Fed. Rep. of Germany | 277/51 |
| 468203 | 12/1951 | Italy | 277/513 |

*Primary Examiner*—William A. Cuchlinski, Jr.
*Assistant Examiner*—Jeff Hohenshell
*Attorney, Agent, or Firm*—Emrich & Dithmar

[57] ABSTRACT

A seal assembly for a rotating shaft includes an annular seal washer of flexible, fluid-impermeable material and capable of undergoing creep, i.e., slow movement or change in size while under stress. A helical garter spring encircles the washer and stresses it by biasing it radially inwardly. An annular housing of two interlocking members cooperate to enclose the spring and an O-ring which cooperates with the housing to resiliently clamp the washer to inhibit movement axially and circumferentially of the shaft, while accommodating radial creep under the urging of the spring. Inwardly struck tabs in the housing may engage the spring to inhibit circumferential movement thereof. In one embodiment, one of the housing members has circumferentially spaced-apart fingers adapted to be interleaved with the tabs of a fixture to facilitate assembly of the apparatus.

18 Claims, 2 Drawing Sheets

CREEP SEAL FOR ROTATING SHAFT

BACKGROUND OF THE INVENTION

The present invention relates to fluid-tight seals and, in particular, seals for rotating shafts, which prevent passage of fluids axially along the shaft while accommodating rotation of the shaft. The invention has particular application to the type of rotating shaft seal in which an annular seal member is resiliently urged radially inwardly against the outer surface of the shaft.

It is known to provide a split-ring type of seal formed of carbon, graphite or the like, which is resiliently urged against the shaft by a garter spring. But such prior seal members are relatively brittle and unyieldable. In the event of any eccentricities in the shaft, such seal members are subject to uneven wear, which results in leakage.

It is also known to provide a somewhat flexible or resilient annular seal which has an outer edge thereof bonded to a bracket, the seal member being cantilevered from the bracket and having an inner end which is urged by a garter spring into sealing engagement with the shaft. While this construction affords some flexibility to accommodate eccentricities or irregularities in the shaft, such irregularities still encourage wear and, eventually, leakage will result because the outer end of the seal member is fixed. Furthermore, irregularities in the shaft cause uneven loading on the bonded end of the seal member, which tend to weaken the bond and can result in leakage at the secondary seal formed by the bond.

SUMMARY OF THE INVENTION

It is a general object of the present invention to provide an improved seal apparatus for a rotating shaft, which avoids the disadvantages of prior seals while affording additional structural and functional advantages.

An important feature of the present invention is to provide a seal apparatus which will maintain a good seal with the associated shaft, despite eccentricities or other irregularities in the shaft.

In connection with the foregoing feature, it is another feature of the invention to provide a seal apparatus of the type set forth, which maintains good sealing engagement with the shaft, despite wear of the seal member.

Still another feature of the invention is the provision of a seal apparatus of the type set forth, wherein the seal member is inhibited from movement axially or circumferentially of the associated shaft, but is allowed to undergo creep movement under stress radially of the associated shaft.

Still another feature of the invention is the provision of a seal apparatus of the type set forth, which is of relatively simple and economical construction.

Yet another feature of the invention is the provision of a seal apparatus of the type set forth, which is characterized by ease of assembly.

In connection with the foregoing feature, still another feature of the invention is the provision of an improved method for assembling a seal apparatus of the type set forth.

Certain ones of these features are attained by providing seal apparatus for a rotating shaft comprising: an annular seal member formed of a flexible fluid-impermeable material capable of creep so that it can undergo slow movement or change in size while under stress, the seal member having an inner surface adapted for sealing engagement with the outer surface of the associated shaft, bias means engageable with the seal member for resiliently urging it radially inwardly around the entire circumference thereof, and retaining means discrete from the seal member but engageable therewith for inhibiting movement thereof axially and circumferentially of the associated shaft while accommodating creep movement thereof radially of the associated shaft under the urging of the bias means.

Other features of the invention are attained by providing a method of assembling a seal apparatus including first and second annular housing members respectively having interlocking portions and adapted for cooperation to enclose a plurality of internal annular members, wherein one of the annular housing members has a plurality of circumferentially spaced-apart openings therein, the method comprising the steps of: providing a circular fixture having at the outer periphery thereof a plurality of circumferentially spaced-apart tabs extending axially in the same direction, disposing the one annular housing member on the fixture substantially coaxially therewith with the tabs respectively extending through the openings, placing at least one of the internal annular members on the one housing member substantially coaxially therewith and radially inside the tabs, placing at least one of the internal annular members on the one housing member substantially coaxially therewith and radially outside the tabs, then placing the other housing member over the one housing member and the internal annular members thereon while they are disposed on the fixture, and snap-fitting the interlocking portions together in an assembled condition wherein the first and second housing members cooperate to enclose the internal annular members.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
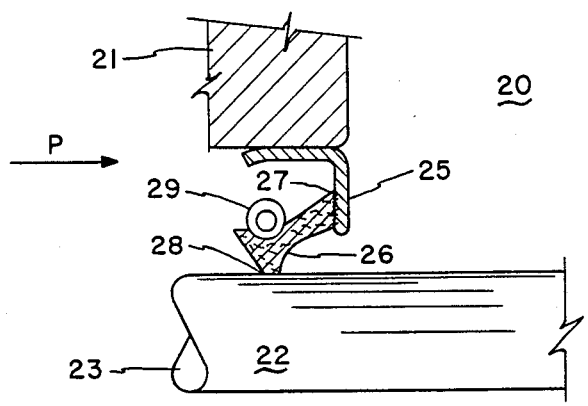
FIG. 1 is a fragmentary view in vertical section of a prior art seal apparatus for a rotating shaft.

Referring to FIG. 1, there is illustrated a prior art seal assembly, generally designated by the numeral 20, which provides a fluid-tight seal between a frame 21 and the outer surface 22 of a shaft 23, which extends through an opening in the frame 21. The fluid being sealed against is disposed to the left of FIG. 1, and exerts a pressure in the direction of the arrow P.

The seal assembly 20 includes an annular bracket 25, generally L-shaped in transverse cross section, one leg of which is fixedly secured to the frame 21, and the other leg of which projects radially inwardly toward the shaft 23. An annular seal member 26 has one end thereof fixedly secured to the inwardly extending leg of the bracket 25 by bonding, as at 27. The seal member 26 is cantilevered from the bracket 25 and has a distal end which is provided with an annular bearing surface 28 disposed for sealing engagement with the outer surface 22 of the shaft 23. A helical garter spring 29 encircles the distal end of the seal member 26 and resiliently urges it radially inwardly for holding the bearing surface 28 in sealing engagement with the shaft 23. The seal member 26 may be formed of any suitable fluid-impermeable material, such as rubber, leather or a plastic material such as polytetrafluoroethylene of the type sold under the trademark "TEFLON" by E. I. Dupont DeNemours & Co.

While the seal assembly 20 affords adequate sealing when the outer surface 22 of the shaft 23 is nearly perfectly circularly cylindrical, the bearing surface 28 tends to wear if the outer surface 22 of the shaft 23 has any eccentricities or other any irregularities therein. Thus, for example, if the outer surface 22 of the shaft 23 is eccentric or out-of-round the "high" part of the shaft will bear harder against the bearing surface 28 than the diametrically opposite side of the shaft 23, thus tending to produce wear at the high point and tending to produce a gap at the opposite side of the shaft. Because of the limited flexibility of the seal member 26, the seal assembly 20 can withstand a certain amount of wear, but eventually it will tend to leak, because the seal member is fixed to the bracket 25 and, therefore, has a limited amount of give. This is particularly true of seal members formed of TEFLON, which are naturally stiffer than rubber. Not only does the wear from eccentricities in the shaft tend to cause leakage at the primary seal formed by the bearing surface 28, but the uneven loading on the seal member 26 can also tend to stress and weaken the bonding at 27, which forms a secondary seal. Thus, this secondary seal also tends to become damaged and leak.

Figure 2:
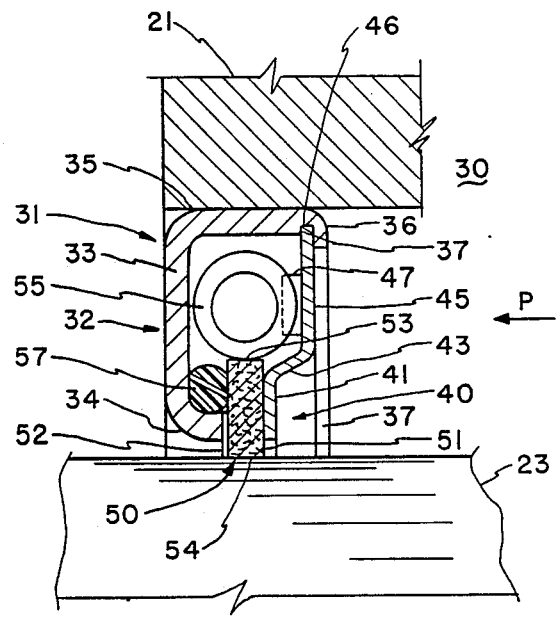
FIG. 2 is an enlarged view, similar to FIG. 1, illustrating the seal apparatus of a first embodiment of the present invention.
Figure 3:
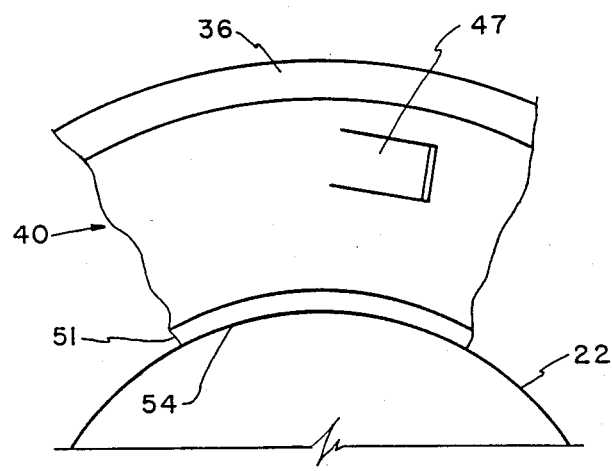
FIG. 3 is a fragmentary side elevational view of the seal apparatus of FIG. 2 as viewed from the right-hand side thereof.

Referring now to FIGS. 2 and 3, there is illustrated a seal assembly 30, constructed in accordance with and embodying the features of a first embodiment of the present invention, to provide a fluid-tight seal between the frame 21 and the shaft 23, while avoiding the drawbacks of the prior art seal assembly 20. The seal assembly 30 includes a housing, generally designated by the numeral 31, which includes an annular housing member 32, generally channel-shaped in transverse cross section. The housing member 32 has a flat annular side retaining wall 33 disposed generally perpendicular to the shaft 23, and integral at its inner end with an inner flange 34 extending from the wall 33 substantially perpendicular thereto. The side wall 33 is integral at its other end with a cylindrical outer wall 35 which projects normal to the wall 33 in the same direction as the inner flange 34, but for a greater extent, the outer wall 35 being provided at its distal end with a lip 36 of reduced thickness which defines an annular shoulder 37. In use, the outer wall 35 is adapted to be fixedly secured to the frame 21 around the entire circumference of the opening therethrough for the shaft 23.

The housing 31 also includes an annular retaining member 40 which has a flat annular inner retaining wall 41, integral at its outer periphery with an outwardly and axially inclined shoulder 43, which is in turn integral at its outer periphery with a flat annular outer wall 45 disposed substantially parallel to the inner retaining wall 41. The outer wall 45 has a circular outer edge 46, and may be provided with one or more tabs 47 struck therefrom and projecting inwardly, for a purpose to be explained more fully below.

The seal assembly 30 also includes an annular seal washer 50 formed of a material which has a creep characteristic, i.e., it is capable of movement or change of size under relatively low stress. Suitable materials include rubber, TEFLON and leather. The seal washer 50 is in the form of a flat ring, having parallel flat annular side surfaces 51 and 52 interconnected at their outer edges by a cylindrical outer surface 53 and interconnected at their inner edges by a substantially cylindrical inner seal surface 54. In use, the seal washer 50 is disposed between the housing member 32 and the retaining member 40 of the housing 31. More specifically, the side surfaces 51 and 52 of the seal washer 50 are respectively disposed in facing relationship with the inner retaining wall 41 of the retaining member 40 and the inner retaining flange 34 of the housing member 32 and project radially inwardly therefrom.

The seal assembly 30 also includes a helical garter spring 55, which is disposed in use in encircling relationship with the seal washer 50, for engagement with the outer surface 53 thereof, resiliently to urge the seal washer 50 radially inwardly. The seal assembly 30 also includes an 0-ring 57, which may be formed of rubber or the like, and is disposed in use inside the housing 31 in an encircling relationship with the inner retaining flange 34, between the side retaining wall 33 of the housing member 32 and the side surface 52 of the seal washer 50, for cooperation therewith resiliently to urge the seal washer 50 into sealing engagement with the inner retaining wall 41 of the retaining member 40.

In assembling the seal assembly 30, the 0-ring 57 is placed inside the housing member 32 in encircling relationship with the inner retaining flange 34 thereof. The seal washer 50 is disposed against the 0-ring 57 coaxially therewith and the garter spring 55 is disposed in encircling relationship with the seal washer 50, in engagement with the outer surface 53 thereof. Then the retaining member 40 is placed over the garter spring 55 and the seal washer 50, the retaining member 40 being so dimensioned that the outer edge 46 thereof overlaps the shoulder 37 on the housing member 32. The retaining member 40 is pressed against the seal washer 50 until the outer edge 46 of the retaining member 40 rests against the shoulder 37, thereby compressing the seal washer 50 and the 0-ring 57 between the side retaining wall 33 of the housing member 32 and the inner retaining wall 41 of the retaining member 40. With the parts thus compressed, the reduced-thickness lip 36 is deformed radially inwardly around the entire circumference thereof into overlapping engagement with the outer edge 46 of the retaining member 40, thereby securely to clamp the parts in their assembled condition, illustrated in FIG. 2. The retaining member 40 cooperating with the housing member 32 to form the housing 31.

When the parts are thus assembled, it will be appreciated that the seal washer 50 is resiliently clamped between the 0-ring 57 and the inner wall 41 of the retaining member 40, for holding the seal washer 50 against movement axially or circumferentially of the associated shaft 23. The spring 55 is disposed in engagement with the seal washer 50 for placing it under stress and biasing it radially inwardly, the spring 55 being completely enclosed within the housing 31. If tabs 47 are providing on the retaining member 40, they engage between coils of the spring 55 to prevent circumferential movement thereof.

In operation, the seal assembly 30 encircles the shaft 23, with the inner seal surface 54 of the seal washer 50 being disposed in sealing engagement with the outer surface 22 of the shaft 23 around the entire circumference thereof. The seal washer 50 may be so dimensioned that the diameter of the inner seal surface 54 is slightly less than the diameter of the outer surface 22 of the shaft 23, so that the seal washer 50 will have to be slightly stretched to install the seal assembly 30 on the shaft 23. This will ensure a good initial seal before the creeping action has begun. Typically, the fluid being sealed against will be disposed to the right in FIG. 2, exerting pressure on the seal assembly 30 in the direction of the arrow P. If the shaft 23 is eccentric or irregular, it will tend to wear the inner seal surface 54 of the seal washer 50, just as in the prior art constructions. But because the seal washer 50 is capable of creep, it will, under the continual radially inwardly directed bias force of the spring 55, tend to move slowly radially inwardly. The parts are designed so that this creep rate will be greater than or equal to the wear rate of the inner seal surface 54, so as to maintain good sealing contact of that surface with the outer surface 22 of the shaft 23. Fluid may infiltrate the interior of the housing 31, either around the outer edge of the retaining member 40 or through the openings for the tabs 47, if they are provided. But the fluid is prevented from passing around the seal washer 50 by secondary seals provided between the seal washer 50 and the inner retaining wall 41 of the retaining member 40, and the 0-ring 57 between the seal washer 50 and the side retaining wall 33 of the housing member 32.

The parts are arranged so that the clamping force exerted on the seal washer 50 by the retaining member 40 and the 0-ring 57 exceeds the frictional force exerted on the seal washer 50 by the rotating shaft 23, so that the seal washer 50 will be held against rotational movement with the shaft 23. But the clamping force is such as to accommodate the radial creep of the seal washer 50 under the urging of the bias spring 55. The housing 31 confines the spring 55, so that it cannot fall out of engagement with the outer surface 53 of the seal washer 50.

Figure 6:
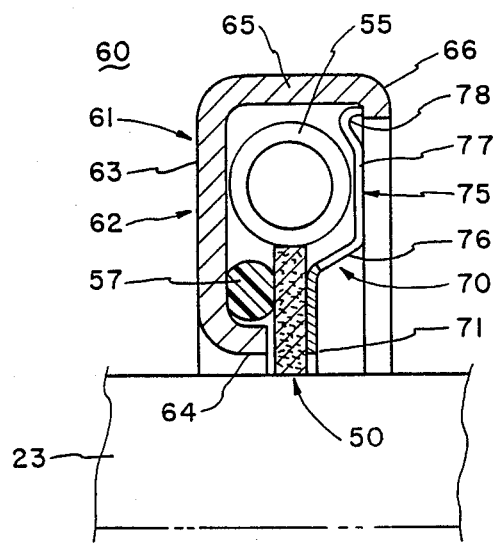
FIG. 6 is an enlarged view similar to FIG. 2, of the seal apparatus of FIG. 4 in assembled condition and with the assembly fixture removed.

Referring now also to FIG. 6, there is illustrated another embodiment of the seal assembly of the present invention, generally designated by the numeral 60. The seal assembly 60 has an annular housing 61 which includes an annular housing member 62, generally channel-shaped in transverse cross section. The housing member 62 has a flat, annular, side retaining wall 63, provided at the inner end thereof with an integral inner retaining flange 64 disposed substantially perpendicular to the side retaining wall 63. Integral with the side retaining wall 63 at the outer end thereof and extending therefrom substantially perpendicular thereto in the same direction as the inner retaining flange 64 is an outer wall 65, which extends well beyond the distal end of the inner retaining flange 64 and is provided at its distal end with a radially inwardly extending lip 66.

The seal assembly 60 also includes a retaining member 70, which is preferably a flexible member formed of metal, such as spring steel. The retaining member 70 is annular in shape and includes a flat, annular, inner retaining wall 71, integral at its outer edge with a plurality of radially outwardly extending, and circumferentially spaced-apart fingers 75. Each of the fingers 75 includes a shoulder 76 which is integral with the outer edge of the retaining wall 71 and inclined with respect thereto, the shoulder 76 being integral at its outer end with a flat outer wall 77 disposed substantially parallel with the retaining wall 71, but offset therefrom by the shoulder 76. Each outer wall 77 is integral at its outer end with a hook 78.

The seal assembly 60 also includes a seal washer 50, a helical garter spring 55 and an 0-ring 57, which may be identical in construction and function to the same parts described above in connection with the seal assembly 30.

In assembling the seal assembly 60, the 0-ring 57, the seal washer 50 and the spring 55 may be disposed in the housing member 62, in the same manner as was described above in connection with the housing member 32 in the seal assembly 30. Then, the retaining member 70 may be pressed against the seal washer 50, the hooks 78 being disposed in camming engagement with the lip 66 of the housing member 62. As the retaining member 70 is pressed against the seal washer 50, the fingers 75 deflect to allow the hooks 78 to cam past the lip 66, thereby to allow the retaining member 70 and the housing member 62 to snap-fit together into an interlocking assembled configuration, illustrated in FIG. 6, wherein the hooks 78 are latched inside the lip 66. In this assembled configuration, the retaining wall 71 of the retaining member 70 is disposed in sealing relationship with the side surface 51 of the seal washer 50, and resiliently urges the seal washer 50 into sealing engagement with the 0-ring 57, which is in turn sealingly engaged with the side retaining wall 63 of the housing member 62 to form a secondary seal. In operation, the seal assembly 60 functions in the same manner as was explained above, in connection with the seal assembly 30.

Figure 7:
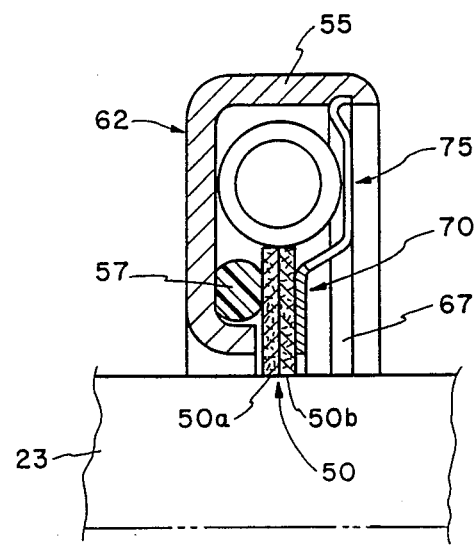
FIG. 7 is a view similar to FIG. 6, illustrating another embodiment of the seal apparatus with a modified housing and seal washer.

Referring to FIG. 7, there is illustrated an alternative form of the seal assembly 60, in which the housing member 62 is not provided with the lip 66. Instead, there is provided in the inner surface of the outer wall 65, adjacent to the distal end thereof, an annular recess 67 in which the hooks 78 engage when the seal assembly 60 is assembled. Also illustrated in FIG. 7 is an alternative form of seal washer 50 which consists of two layers of material 50a and 50b bonded together. The materials of the layers 50a and 50b may be different, to provide chemical, thermal or physical properties conducive to sealing difficult fluids. While two layers are illustrated, it will be appreciated that other numbers of layers could be provided in the seal washer 50.

Figure 9:
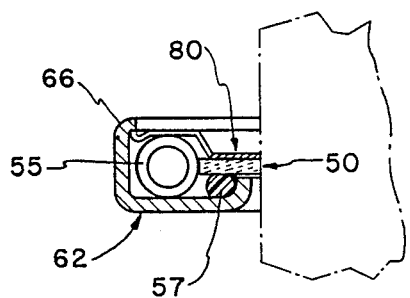
FIG. 9 is a fragmentary view in vertical section, similar to FIG. 2 but on a reduced scale and rotated 90 degrees counterclockwise, illustrating another embodiment of the present invention.
Figure 10:
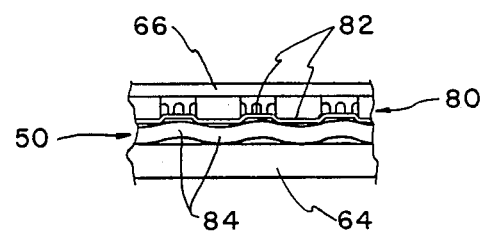
FIG. 10 is a fragmentary elevational view of the seal apparatus of FIG. 9, taken generally from the right-hand side thereof, i.e., looking radially outwardly from the inside of the seal apparatus.

Referring to FIGS. 9 and 10, there is illustrated another version of the seal assembly 60, which utilizes an alternative form of retaining member, generally designated by the numeral 80. The retaining member 80 is substantially identical in construction to the retaining member 70, described above, except that the radially inner edge of the retaining member is provided with a plurality of flutes or corrugations 82 around the entire circumferential extent thereof. In use, these flutes 82 engage the seal washer 50 and create a corresponding series of corrugations or flutes 84 therein. It has been found that this construction enhances the prevention of seepage. It is believed that as each flute or corrugation passes an area of the shaft 23, it cause the fluid being sealed against to be pushed away from the seal member 50.

Figure 8:
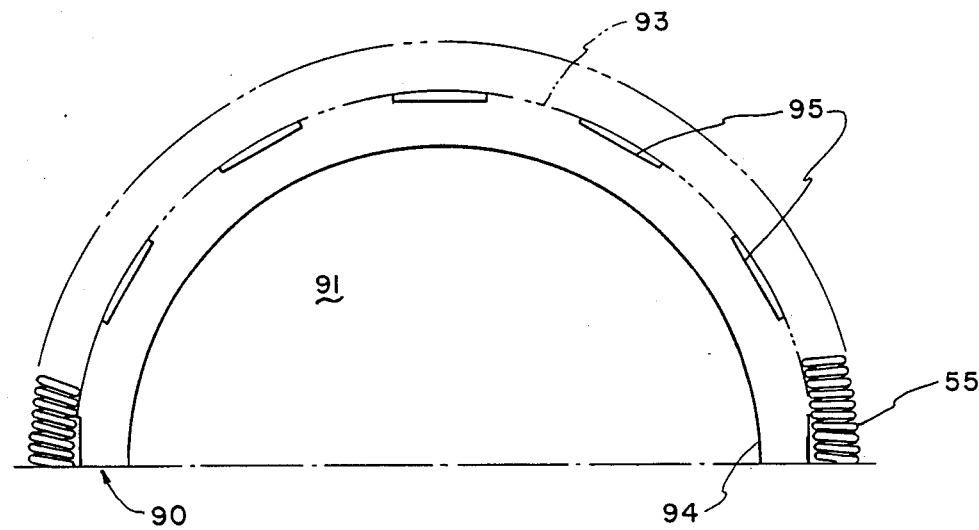
FIG. 8 is a fragmentary side elevational view of a modified form of seal member and associated bias spring for use in the seal apparatus of the present invention.

Referring to FIG. 8, there is disclosed an alternative form of the seal washer of the present invention, generally designated by the numeral 90, which may be used in the seal assemblies 30 or 60. The seal washer 90 is similar in construction to the seal washer 50, having flat substantially parallel annular side surfaces 91 and 92, interconnected at the outer periphery of the seal washer 90 by a substantially cylindrical outer surface 93, and interconnected at the inner periphery of the seal washer 90 by a substantially cylindrical inner seal surface 94. Formed in the outer surface 93 are a plurality of circumferentially spaced-apart and radially inwardly extending recesses 95.

In use, it can be seen that the garter spring 55 engages the outer surface 93 of the seal washer 90 only at the lands between the recesses 95. Thus, the radially inwardly directed bias force exerted by the spring 55 is greater at these areas of contact than at the intervening areas of the recesses 95. This results in a varying contact load between the inner seal surface 94 and the shaft 23. Thus, as each high load area passes an area on the shaft 23, it serves to push any fluid seepage back to the fluid side of the seal assembly.

From the foregoing, it will be appreciated that the constructions of FIG. 8-10 offer alternative methods for enhancing the inhibition of seepage in the seal assemblies 30 and 60.

Figure 4:
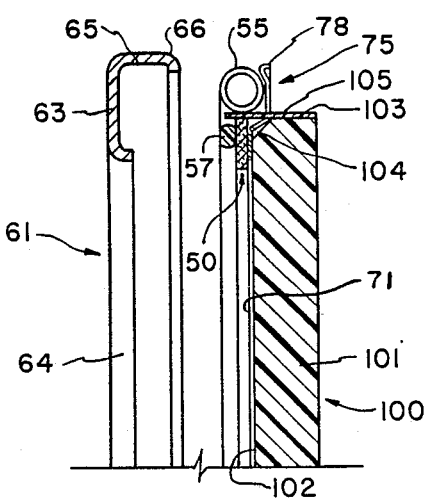
FIG. 4 is a fragmentary view in vertical section, partially exploded, of a seal apparatus in accordance with a second embodiment of the present invention, and an assembly fixture therefor.
Figure 5:
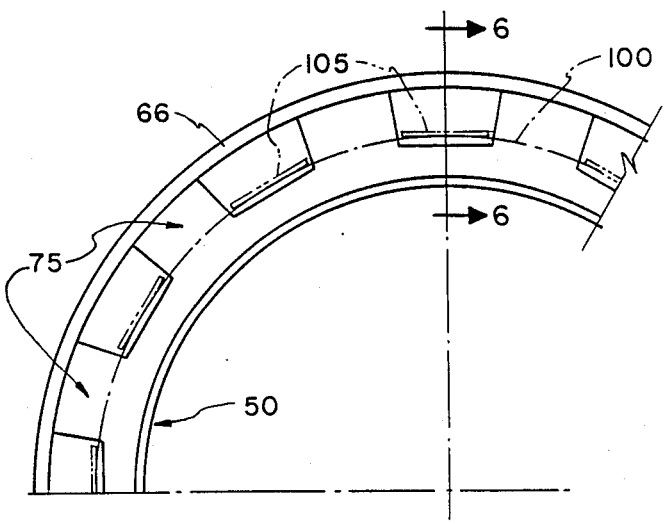
FIG. 5 is a side elevational view of the seal apparatus of FIG. 4 in assembled condition, as viewed from the right-hand side thereof, with the assembly fixture removed, but with its position shown in phantom.

Referring now to FIGS. 4 and 5, there is illustrated a fixture 100 for use in assembling the seal assembly 60. The fixture 100 includes a flat, circular body 101 having a flat support surface 102 and a substantially cylindrical peripheral surface 103. Preferably, the support surface 102 and the peripheral surface 103 are joined by an annular chamfer or bevel 104. Integral with the peripheral surface 103 and projecting axially therefrom beyond the support surface 102 are a plurality of substantially flat, rectangular tabs 105 which are equiangularly spaced apart circumferentially of the body 101.

For purposes of assembling the seal assembly 60, the retaining member 70 (or 80) is placed against the support surface 102 of the body 101. In this regard, the fixture 100 is so dimensioned and arranged that the retaining wall 71 of the retaining member 70 (or 80) rests upon the support surface 102 in back-to-back engagement therewith at the outer periphery thereof, the shoulders 76 of the fingers 75 lie generally along the bevel 104 and the outer walls 77 of the fingers 75 project radially outwardly beyond the peripheral surface 103, with the tabs 105 being interleaved with the fingers 75 and disposed substantially perpendicular thereto. Next, the seal washer 50 (or 90) is disposed against the retaining wall 71 of the retaining member 70 (or 80), the dimensions of the seal washer 50 (or 90) being such that it will be disposed radially inside the tabs 105 of the fixture 100. Next the 0-ring 57 is disposed against the seal washer 50 (or 90), and then the spring 55 is disposed against the inner surface of the fingers 75 of the retaining member 70 (or 80), radially outside the tabs 105. It may be necessary to radially stretch the spring 55 somewhat to fit it over the tabs 105. Finally, the housing member 62 is fitted over the parts assembled on the fixture 100, the side retaining wall 63 being pressed against the 0-ring 57 until the hooks 78 on the fingers 75 snap into interlocking engagement with the lip 66 (or the recess 67) on the housing member 62, thereby bringing the parts into the assembled condition illustrated in FIGS. 6 and 7.

If desired, the fixture 100 may be left in place in the seal assembly 60 until it is ready for use, at which time it can be removed. It can be seen that when the fixture 100 is left in place, the tabs 105 thereof serve to hold the spring 55 out of engagement with the seal washer 50 (or 90), so that the seal washer is not placed under stress until the seal assembly 60 is ready for use. When the fixture 100 is removed, the spring 55 moves into biasing engagement with the seal washer 50 (or 90), placing it under stress. While the fixture 100 is shown oriented vertically in FIG. 4, it will be appreciated that it can be oriented horizontally for performance of the assembly operation just described.

In general, it is desirable to make the seal washer 50 (or 90) as thin as possible, and preferably substantially less than the thickness or outer diameter of the spring 55 in an axial direction, so as to minimize the area of the seal surface 54 (or 94) and thereby maximize the sealing pressure thereat, and maximize the radial creep-inducing stress in the seal washer. In a constructional model of the invention, the thickness of the seal washer 50 (or 90) is in the range of from about 0.015 to about 0.025 inch. The retaining member 40 (or 70 or 80) cooperates with the 0-ring 57 and the inner flange 34 (or 64) of the housing member 32 (or 62) to provide lateral support for the seal washer 50 (or 90) so that, despite its thin construction, it will not undergo lateral deformation under the forces exerted by the spring 55. It has been found that heat also tends to improve the creep characteristics of the seal assembly of the present invention.

In constructional models of the present invention, the housing members 32 and 62 and the retaining members 40, 70 and 80 are all preferably formed of metal, the 0-ring may be formed of rubber and the seal washers 50 or 90 may be formed of rubber, TEFLON or leather, but other materials could be utilized as long as they exhibit creep characteristics. While the spring 55 has been disclosed as a helical garter spring, it will be appreciated that other types of bias springs could be utilized. The fixture 100 is preferably formed of plastic and may be disposable.

From the foregoing, it can be seen that there has been provided an improved seal assembly for a rotating shaft, which is of simple and economical construction, and which maintains good sealing engagement with the shaft despite wear caused by eccentricities or other irregularities in the shaft surface, and which at the same time inhibits any seepage of fluid past the seal assembly. There has also been provided a simple and inexpensive method of assembling such a seal assembly.

I claim:

1. Seal apparatus for a rotating shaft comprising: a thin annular seal member formed of a flexible fluid-impermeable material capable of low-stress creep so that it can undergo slow movement or change in size while under relatively low stress, said seal member having an inner surface adapted for sealing engagement with the outer surface of the associated shaft, bias means coupled to said seal member for placing it under relatively low stress sufficient to induce radial creep movement thereof by resiliently urging it radially inwardly around the entire circumference thereof, said bias means having a width axially of the associated shaft substantially greater than the axial thickness of said seal member, and retaining means discrete from said seal member, said retaining means including resilient means and being disposed in resilient clamping engagement with said seal member for inhibiting movement thereof axially and circumferentially of the associated shaft while accommodating creep movement thereof radially of the associated shaft under the urging of said bias means.

2. The seal apparatus of claim 1, wherein said annular seal member includes a flat seal washer having opposed flat side surfaces interconnected by said inner surface.

3. The seal apparatus of claim 2, wherein said annular seal member has an outermost peripheral surface engageable with said bias means, said outermost peripheral surface having a plurality of circumferentially spaced-apart recesses therein.

4. The seal apparatus of claim 1, wherein said bias means includes a helical garter spring extending circumferentially around said seal member in engagement therewith.

5. The seal apparatus of claim 1, wherein said retaining means includes secondary seal means for forming a fluid-tight seal between said annular seal member and said retaining means.

6. The seal apparatus of claim 1, wherein said retaining means includes means engageable with said bias means for preventing movement thereof circumferentially of the associated shaft.

7. The seal apparatus of claim 1, wherein said retaining means includes means cooperating with said annular seal member for enclosing said bias means.

8. The seal apparatus of claim 1, wherein said inner surface of said seal member has an axial extent in the range of from about 0.015 inch to about 0.025 inch, said retaining means providing lateral support for said seal member sufficient to prevent lateral deformation thereof under the radial force exerted by said bias means.

9. Seal apparatus for a rotating shaft comprising: a thin annular seal member formed of a flexible fluid-impermeable material capable of low stress creep so that it can undergo slow movement or change in size while under relatively low stress, said seal member having opposed side surfaces interconnected by an inner surface adapted for sealing engagement with the outer surface of the associated shaft, bias means engageable with said seal member for placing it under relatively low stress sufficient to induce radial creep movement thereof by resiliently urging it radially inwardly around the entire circumference thereof, said bias means having a width axially of the associated shaft substantially greater than the axial thickness of said seal member, housing means having first and second annular retaining portions respectively disposed along said opposed side surfaces of said seal member, and resilient secondary seal means disposed between said seal member and one of said retaining portions for resiliently urging said seal member against the other of said retaining portions for forming a fluid-tight seal between said seal member and said retaining portions, said retaining portions and said secondary seal means cooperating to retain said seal member against movement axially and circumferentially of the associated shaft while accommodating creep movement thereof radially of the associated shaft under the urging of said bias means.

10. The seal apparatus of claim 9, wherein said secondary seal means includes an O-ring.

11. The seal apparatus of claim 9, wherein said housing means cooperates with said annular seal member to enclose said bias means.

12. The seal apparatus of claim 9, wherein said housing means includes two housing members respectively provided with interlocking means releasably engageable with each other for holding said housing means in an assembled condition.

13. The seal apparatus of claim 12, wherein said interlocking means include an annular flange on one of said housing members and an outer peripheral portion on the other one of said housing members engageable with said annular flange.

14. The seal apparatus of claim 12, wherein said interlocking means includes an annular recess formed in one of said housing members and a flexible outer peripheral portion on the other of said housing members engageable in said recess.

15. The seal apparatus of claim 9, wherein one of said retaining portions has a fluted inner edge for effecting a corresponding fluting of the inner edge of said seal member.

16. The seal apparatus of claim 9, wherein said housing means has a plurality of circumferentially spaced-apart openings therein.

17. The seal apparatus of claim 16, wherein said housing means includes two annular housing members adapted for interlocking engagement with each other, one of said housing members having a plurality of circumferentially spaced-apart and radially outwardly extending fingers.

18. The seal apparatus of claim 16, and further comprising an assembly fixture having a plurality of tabs respectively receivable through said openings and between said seal member and said bias means for holding said bias means out of engagement with said seal member.

* * * * *